United States Patent [19]
Chang et al.

[11] Patent Number: 5,763,108
[45] Date of Patent: Jun. 9, 1998

[54] HIGH SATURTION MAGNETIZATION MATERIAL AND MAGNETIC HEAD FABRICATED THEREFROM

[75] Inventors: Jei-Wei Chang, Cupertino; Wen-Cherng Lau, San Jose; Kazumasa Yasuda, Sunnyvale, all of Calif.

[73] Assignee: Headway Technologies, Inc., Milpitas, Calif.

[21] Appl. No.: 810,061

[22] Filed: Mar. 5, 1997

[51] Int. Cl.$^6$ ............................................. G11B 5/66
[52] U.S. Cl. ............................. 428/694 R; 428/694 TR; 428/694 TS; 428/900; 360/113; 324/252; 205/90; 204/192.2; 427/192.2
[58] Field of Search ............... 428/694 R, 694 TR, 428/694 TS, 900; 360/113; 324/252; 205/90

[56] References Cited

U.S. PATENT DOCUMENTS 5,063,653  11/1991  Sandaiji et al. ..................... 29/603
5,549,978  8/1996  Iwasaki ............................... 428/692
5,559,654  9/1996  Das ..................................... 360/126

*Primary Examiner*—Leszek Kiliman
*Attorney, Agent, or Firm*—George O. Saile; Stephen B. Ackerman; Alek P. Szecsy

[57] ABSTRACT

A magnetic material which may be employed as a thin film magnetic layer within magnetic heads, and a method for forming the magnetic material as a thin film magnetic layer for use within magnetic heads. The magnetic material has an elemental composition comprising about 40 to about 60 weight percent iron, about 40 to about 60 weight percent nickel and about 0.002 to about 1 weight percent tin. The magnetic material may be formed as a thin film magnetic layer for use within a magnetic head through an electrochemical plating method employing an aqueous plating solution comprising iron (II) ions, nickel (II) ions and tin (II) ions. When electrodeposited and anisotropically magnetically aligned, or when thermally annealed and anisotropically magnetically aligned the thin film magnetic layer possess a higher saturation magnetization, a higher anisotropy, a comparable easy axis coercivity, a lower hard axis permittivity and a higher resistivity than conventional thin film magnetic layers formed of permalloy (nickel-iron 80:20 w/w) alloys.

18 Claims, 2 Drawing Sheets

HIGH SATURTION MAGNETIZATION MATERIAL AND MAGNETIC HEAD FABRICATED THEREFROM

BACKGROUND OF THE INVENTION

1. Field of the Invention

The present invention relates generally to high saturation magnetization magnetic materials. More particularly, the present invention relates to magnetic heads fabricated from high saturation magnetization magnetic materials.

2. Description of the Related Art

The recent and continuing advances in computer and information technology have been made possible not only by the correlating advances in the functionality, reliability and speed of semiconductor integrated circuits, but also by the correlating advances in the storage density and reliability of direct access storage devices (DASDs) employed in digitally encoded magnetic data storage and retrieval.

Storage density of direct access storage devices (DASDs) is typically measured as areal storage density of a magnetic data storage medium formed upon a rotating magnetic data storage disk within a direct access storage device (DASD) magnetic data storage enclosure. The areal storage density of the magnetic data storage medium is defined largely by the track width, the track spacing and the linear magnetic domain density within the magnetic data storage medium. The track width, the track spacing and the linear magnetic domain density within the magnetic data storage medium are in turn determined by several principal factors, including but not limited to: (1) the magnetic read-write characteristics of a magnetic read-write head employed in reading and writing digitally encoded magnetic data into and from the magnetic data storage medium; (2) the magnetic domain characteristics of the magnetic data storage medium which is formed upon the rotating magnetic data storage disk; and (3) the separation distance of the magnetic read-write head from the magnetic data storage medium.

With regard to the magnetic write characteristics of magnetic write heads and magnetic read-write heads employed in writing digitally encoded magnetic data into a magnetic data storage medium, it is theoretically desirable for advanced magnetic write heads and magnetic read-write heads which employ magnetic inductor write elements to form those magnetic inductor write elements from magnetic materials which simultaneously possess: (1) a high saturation magnetization (i.e.: a high magnetic moment); (2) a high magnetic anisotropy; (3) a low easy axis coercivity; (4) a high hard axis magnetic permittivity; and (5) a high resistivity. Magnetic materials which simultaneously possess the foregoing properties should theoretically provide magnetic inductor write elements able to write digitally encoded magnetic data at high data rates and with minimal stray magnetic fields into magnetic data storage media having relatively high coercivities, thus providing increased areal densities of digitally encoded magnetic data written into those magnetic data storage media.

The present invention is thus in general directed towards providing a magnetic material which when formed into a magnetic inductor write element employed in writing digitally encoded magnetic data into a magnetic data storage medium simultaneously possesses: (1) a high saturation magnetization; (2) a high magnetic anisotropy; (3) a low easy axis coercivity; (4) a high hard axis magnetic permittivity; and (5) a high resistivity, that the present invention is generally directed. Since magnetic inductor write elements within magnetic write heads and magnetic read-write heads are conventionally formed from permalloy (ie: nickel-iron 80:20 w/w) magnetic materials, the present invention is directed more specifically towards providing magnetic materials which simultaneously possess at least several of the following properties: (1) a saturation magnetization higher than permalloy magnetic materials; (2) a magnetic anisotropy higher than permalloy magnetic materials; (3) an easy axis coercivity lower than permalloy magnetic materials; (4) a hard axis magnetic permittivity higher than permalloy magnetic materials; and (5) a resistivity higher than permalloy alloy magnetic materials. Magnetic inductor write elements formed within magnetic write heads and magnetic read write heads of permalloy magnetic materials typically possess: (1) a saturation magnetization of from about 8 to about 12 kgauss; (2) a magnetic anisotropy of from about 3 to about 5 oersteds; (3) an easy axis coercivity of from about 0.3 to about 0.5 oersteds; (4) a hard axis magnetic permittivity of from about 1800 to about 2600; and (5) and a resistivity of from about 15 to about 25 micro-ohm.cm.

Various novel methods have been disclosed in the art for forming magnetic inductor elements within magnetic heads. For example, Sandaiji et al., in U.S. Pat. No. 5,063,653, disclose a laser induced etching method for forming a ferrite/Sendust composite magnetic inductor element for use within a magnetic head. The method employs forming an electrochemically inactive metal film upon the surface of a gapped bar of the ferrite/Sendust composite prior to laser induced etching of the gapped bar in an aqueous alkali metal hydroxide solution. Through the method, there is avoided dull edges within the trackwidth of a magnetic inductor element formed from the gapped bar.

In addition, Das, in U.S. Pat. No. 5,559,654 discloses a plating method for fabricating within a thin film magnetic head a magnetic inductor element while avoiding use of a high magnetic field otherwise typically employed within a plating cell employed within the plating method. To avoid use of the high magnetic field, there is formed through the plating method magnetic inductor element structures having formed therein narrow poletips.

Desirable in the art are additional magnetic write heads and magnetic read-write heads, as well as methods for fabricating the additional magnetic write heads and the additional magnetic read-write heads, where the additional magnetic write heads and the additional magnetic read-write heads have fabricated therein magnetic inductor elements of magnetic materials simultaneously possessing: (1) a high saturation magnetization; (2) a high magnetic anisotropy; (3) a low easy axis coercivity; (4) a high hard axis magnetic permittivity; and (5) a high resistivity. It is towards the foregoing goals that the present invention is most specifically directed.

SUMMARY OF THE INVENTION

A first object of the present invention is to provide a magnetic material which when fabricated into a magnetic inductor element within a magnetic head simultaneously possesses: (1) a high saturation magnetization; (2) a high magnetic anisotropy; (3) a low easy axis coercivity; (4) a high hard axis permittivity; and (5) a high resistivity.

A second object of the present invention is to provide a method for forming the magnetic material of the first object of the present invention into a magnetic inductor element within a magnetic head, such as but not limited to a magnetic write head or a magnetic read-write head.

A third object of the present invention is to provide a method in accord with the second object of the present invention, which method is readily manufacturable.

In accord with the objects of the present invention, there is provided by the present invention a magnetic material which when fabricated into a magnetic inductor element within a magnetic head simultaneously possesses: (1) a high saturation magnetization; (2) a high magnetic anisotropy; (3) a low easy axis coercivity; (4) a high hard axis magnetic permittivity; and (5) a high resistivity, as well as a method through which the magnetic material may be fabricated into the magnetic inductor element within the magnetic head. A magnetic material which possesses the foregoing properties has been determined experimentally to be a magnetic material having an elemental composition comprising: (1) about 40 to about 60 weight percent iron; (2) about 40 to about 60 weight percent nickel; and (3) about 0.002 to about 1 weight percent tin.

Similarly, it has been determined experimentally that the magnetic material in accord with the present invention has, when formed into a thin film magnetic inductor element, in comparison with an otherwise conventional thin film magnetic inductor element formed of a permalloy magnetic material: (1) a higher saturation magnetization; (2) a higher magnetic anisotropy; (3) a comparable easy axis coercivity; (4) a lower hard axis permittivity; and (5) a higher resistivity.

The magnetic material in accord with the present invention may be readily fabricated into a magnetic inductor element within a magnetic head, such as but not limited to a magnetic write head or a magnetic read write head. As is disclosed within the preferred embodiment of the present invention, the magnetic material of the present invention may be fabricated into a magnetoresistive (MR) read-write head through methods including but not limited to electrochemical plating methods. Since methods such as electrochemical plating methods are known in the art of magnetic head fabrication, including but not limited to magnetoresistive (MR) read-write head fabrication, the magnetic material of the present invention may be readily fabricated into magnetic inductor elements within magnetic heads. For similar reasons, the method through which is formed a magnetic head having formed therein a magnetic inductor element from the magnetic material of the present invention is also readily manufacturable.

BRIEF DESCRIPTION OF THE DRAWINGS

The objects, features and advantages of the present invention are understood within the context of the Description of the Preferred Embodiment, as set forth below. The Description of the Preferred Embodiment is understood within the context of the accompanying drawings, which form a material part of this disclosure, wherein.

DESCRIPTION OF THE PREFERRED EMBODIMENTS

The present invention provides a magnetic material and a method for fabricating the magnetic material into a magnetic inductor element within a magnetic head, where the magnetic material when fabricated into the magnetic inductor element possesses: (1) a high saturation magnetization; (2) a high magnetic anisotropy; (3) a low easy axis coercivity; (3) a high hard axis magnetic permittivity; and (4) a high resistivity. It has been found experimentally that a magnetic material which when fabricated into a magnetic inductor element employed within a magnetic head simultaneously possesses the foregoing properties has an elemental composition comprising: (1) about 40 to about 60 weight percent iron; (2) about 40 to about 60 weight percent nickel; and (3) about 0.002 to about 1 weight percent tin. More preferably, the magnetic inductor material has an elemental composition comprising: (1) about 54 to about 56 weight percent iron; (2) about 44 to about 46 weight percent nickel; and (3) about 0.2 to about 0.5 weight percent tin. Yet more preferably, the magnetic inductor material has an elemental composition consisting essentially of (1) about 40 to about 60 weight percent iron; (2) about 40 to about 60 weight percent nickel; and (3) about 0.002 to about 1 weight percent tin. Most preferably, the magnetic inductor material has an elemental composition consisting essentially of: (1) about 54 to about 56 weight percent iron; (2) about 44 to about 46 weight percent nickel; and (3) about 0.2 to about 0.5 weight percent tin.

The magnetic material of the present invention may be employed in forming magnetic inductor elements within magnetic heads including but not limited to inductive write magnetic heads, inductive read magnetic heads, inductive read-write magnetic heads and magnetoresistive (MR) read-write magnetic heads (i.e. inductive write/magnetoresistive (MR) read magnetic heads). Advantageously, the magnetic material of the present invention may also be employed in forming magnetic shield layers within any of the magnetic heads as listed above, as well as within any of several additional types of magnetic heads. Thus, the magnetic material of the present invention may also be employed in forming a merged magnetoresistive (MR) read-write magnetic head where one of the magnetic inductor pole layers within the merged magnetoresistive (MR) read-write magnetic head simultaneously serves as a shield layer within the merged magnetoresistive (MR) read-write magnetic head. Similarly advantageously, the magnetic material of the present invention may also be employed in forming magnetic flux guides within magnetic sensors employed within magnetic sensing applications.

Figure 1:
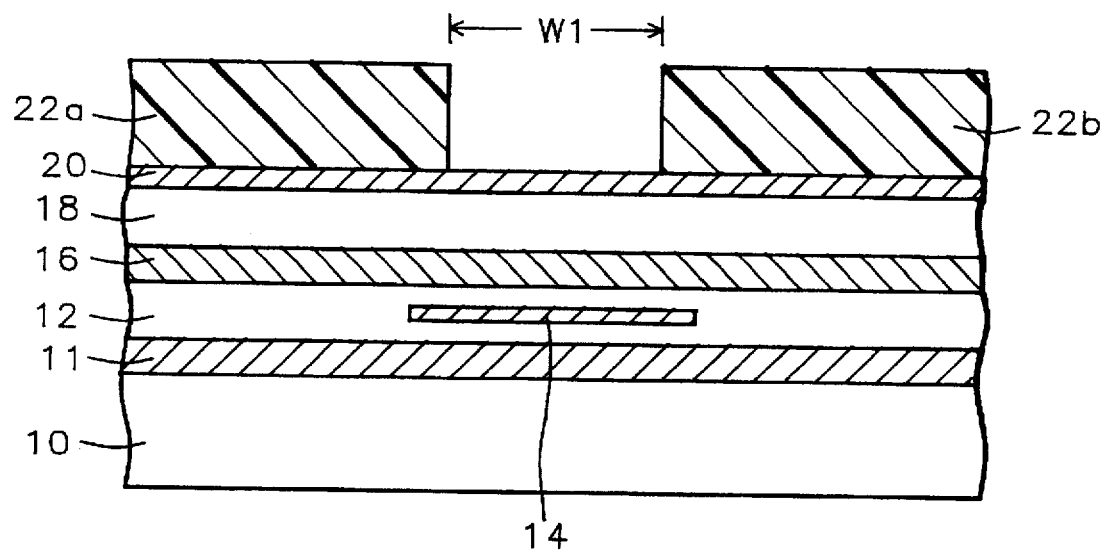
FIG. 1 to FIG. 4 show a series of schematic cross-sectional diagrams illustrating the results of progressive stages in forming a magnetoresistive (MR) read-write head in accord with a preferred embodiment of the method of the present invention.

Referring now to FIG. 1 to FIG. 4, there is shown a series of schematic cross-sectional diagrams illustrating the results of progressive stages in fabricating within a magnetoresistive (MR) read-write head employed within digitally encoded magnetic data storage and retrieval a pair of magnetic inductor elements formed from the magnetic material of the present invention. The pair of magnetic inductor elements is formed in accord with a preferred embodiment of a method of the present invention. Shown in FIG. 1 is a schematic cross-sectional diagram of the magnetoresistive (MR) read-write head at an early stage in its fabrication.

Shown in FIG. 1 is a substrate 10 having formed thereupon or thereover several layers employed in forming a magnetoresistive (MR) read-write head employed in digitally encoded magnetic data storage and retrieval. Within FIG. 1, the substrate 10, as well as the several layers formed thereupon or thereover are illustrated from the view of the air bearing surface (ABS) of the magnetoresistive (MR) read-write head. Within FIG. 1, the layers formed upon or over the substrate 10 include: (1) a first dielectric layer 12 which has formed therein; (2) a magnetoresistive (MR) sensor element layer 14; (3) a first shield layer 11 and a second shield layer 16 formed contacting opposite sides of the first insulator layer 12; (4) a second insulator layer 18 formed upon the second shield layer 16; (5) a blanket first seed layer 20 formed upon the second dielectric layer 18; and (6) a pair of patterned first photoresist layers 22a and 22b formed upon the blanket first seed layer 20. Each of the foregoing substrate and layers may be formed through methods and materials as are conventional in the art of magnetoresistive (MR) read-write head fabrication.

For example, although it is known in the art of magnetoresistive (MR) read-write head fabrication that substrates are typically formed of non-magnetic ceramic materials such as but not limited to borides, nitrides, carbides and oxides, for the preferred embodiment of the present invention, the substrate 10 is preferably, although not exclusively, formed of an alumina-titanium carbide non-magnetic ceramic material as is common in the art of magnetoresistive (MR) read-write head fabrication. The substrate 10 is preferably formed of dimensions such that there may readily be fabricated from the substrate 10 a slider employed within a direct access storage device (DASD) magnetic data storage enclosure.

Similarly, although it is also known in the art of magnetoresistive (MR) read-write head fabrication that dielectric layers may be formed through any of several methods and materials, including but not limited to chemical vapor deposition (CVD) methods, plasma enhanced chemical vapor deposition (PECVD) methods and physical vapor deposition (PVD) sputtering methods through which may be formed dielectric layers of dielectric materials including but not limited to silicon oxide dielectric materials, silicon nitride dielectric materials and aluminum oxide dielectric materials, for the preferred embodiment of the present invention both the first dielectric layer 12 and the second dielectric layer 18 are each preferably formed of an aluminum oxide dielectric material formed over the substrate 10 through a physical vapor deposition (PVD) sputtering method to a thickness of from about 50 to about 500 angstroms each, as is common in the art of magnetoresistive (MR) read-write head fabrication.

With respect to the magnetoresistive (MR) sensor element layer 14, the magnetoresistive (MR) sensor element layer 14 preferably comprises a multilayer formed of a permalloy magnetoresistive (MR) layer longitudinally magnetically exchange biased and aligned through coupling with a pair of patterned antiferromagnetic layers formed thereupon of an iron-manganese alloy, as is common in the art of magnetoresistive (IR) read-write head fabrication. Other materials may, however, be employed in forming the magnetoresistive (MR) sensor element layer 14. Preferably the permalloy magnetoresistive (MR) layer within the magnetoresistive (MR) sensor element layer 14 is formed to a thickness of from about 50 to about 500 angstroms, and the patterned anti-ferromagnetic layers formed thereupon define a trackwidth upon the permalloy magnetoresistive (MR) layer of from about 0.5 to about 5 microns.

Although the first shield layer 11 and the second shield layer 16 within the magnetoresistive (MR) read-write head whose air bearing surface (ABS) is illustrated in FIG. 1 may in addition to being formed through methods and materials as are conventional in the art of magnetoresistive (MR) read-write head fabrication also be formed from the magnetic material of the present invention, within the magnetoresistive (MR) read-write head of the preferred embodiment of the present invention, the first shield layer 11 and the second shield layer 16 are each preferably formed through methods and materials as are conventional in the art of magnetoresistive (MR) read-write head fabrication. Such methods and materials typically, although not exclusively, provide shield layers formed of magnetic materials such as but not limited to permalloy magnetic materials deposited through methods including but not limited to physical vapor deposition (PVD) sputtering methods. Thus, for the preferred embodiment of the magnetoresistive (MR) read-write head of the present invention, the first shield layer 11 and the second shield layer 16 are each preferably formed of a permalloy magnetic material formed to a thickness of from about 1 to about 4 microns contacting opposite sides of the first dielectric layer 12 through a physical vapor deposition (PVD) sputtering method, although other methods and materials may also be employed in forming the first shield layer 11 and the second shield layer 16.

With respect to the blanket first seed layer 20 as illustrated in FIG. 1, the blanket first seed layer 20 may be formed from any of several conductive seed materials which are conventionally employed in forming blanket seed layers upon which are subsequently electroplated conductor materials within magnetic head fabrications. Such conductive seed materials conventionally include but are not limited to permalloy, copper, copper alloy, aluminum, aluminum alloy, titanium and titanium alloy conductor seed materials formed through methods including but not limited to thermally assisted evaporation methods, electron beam assisted evaporation methods, chemical vapor deposition (CVD) methods and physical vapor deposition (PVD) sputtering methods. Through similar deposition methods, the blanket first seed layer 20 may also be formed from an iron-nickel-tin alloy of composition in accord with the present invention. For the magnetoresistive (MR) read-write head of the preferred embodiment of the present invention, the blanket first seed layer 20 is preferably formed of a copper containing conductive seed material, as is most common in the art of magnetic head fabrication, although other conductive seed materials may also be employed in forming the blanket first seed layer 20. Preferably, the blanket first seed layer 20 so formed is formed to a thickness of from about 500 to about 5000 angstroms.

Finally, the patterned photoresist layers 22a and 22b as illustrated in FIG. 1 may similarly be formed from any of several photoresist materials as are conventionally employed in the art of magnetoresistive (MR) read-write head fabrication, including but not limited to photoresist materials selected from the general groups of photoresist materials including but not limited to positive photoresist materials and negative photoresist materials. For the preferred embodiment of the present invention, the patterned photoresist layers 22a and 22b may be formed of either a positive photoresist material or a negative photoresist material. Preferably, the patterned photoresist layers 22a and 22b are each formed upon the blanket first seed layer 20 to a thickness of from about 10000 to about 50000 angstroms to define an aperture of width W1, as illustrated in FIG. 1, preferably from about 0.5 to about 5 microns leaving exposed an equivalent width of the blanket first seed layer 20.

Figure 2:
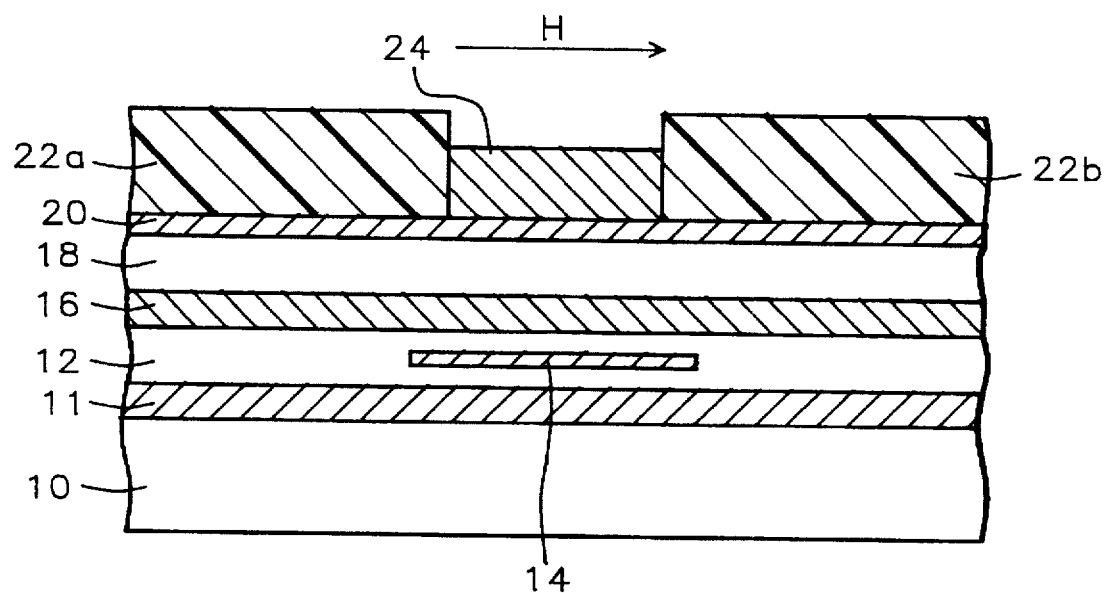

Referring now to FIG. 2, there is shown a schematic cross-sectional diagram illustrating the results of further processing of the magnetoresistive (MR) read-write head the schematic cross-sectional diagram of whose air bearing surface (ABS) is illustrated in FIG. 1. Shown in FIG. 2 is a schematic cross-sectional diagram of the air bearing surface (ABS) of a magnetoresistive (MR) read-write head otherwise equivalent to the air bearing surface (ABS) of the magnetoresistive (MR) read-write head whose schematic cross-sectional diagram is illustrated in FIG. 1, but wherein there is formed through an electroplating method a plated first magnetic inductor layer 24 upon the blanket first seed layer 20 within the aperture defined by the patterned first photoresist layers 22a and 22b. The plated first magnetic inductor layer 24 is preferably formed through an electrochemical plating method in accord with the preferred embodiment of the present invention to provide the plated first magnetic inductor layer 24 which has an elemental composition, as noted above, preferably comprising: (1) about 40 to about 60 weight percent iron; (2) about 40 to about 60 weight percent nickel; and (3) about 0.002 to about 1 weight percent tin. Preferably, the plated first magnetic inductor layer 24 is plated to a thickness no greater than the thickness of the patterned first photoresist layers 22a and 22b, which will provide the plated first magnetic inductor layer 24 of typical thickness from about 1 to about 4 microns, with nominally vertical sidewalls.

Although FIG. 2 illustrates within the preferred embodiment of the present invention the plated first magnetic inductor layer 24, within the method of the present invention, in general, equivalent first magnetic inductor layers (or equivalent subsequent magnetic inductor layers) may be formed through methods other than plating methods, provided that the above specified elemental compositions are provided within equivalent first magnetic inductor layers (as well as the equivalent subsequent magnetic inductor layers) formed through the methods other than the plating methods. The other methods may include, but are not limited to evaporation methods and sputtering methods.

In order to provide the plated first magnetic inductor layer 24 with the foregoing preferred elemental composition, there is preferably employed within the preferred embodiment of the present invention an aqueous plating solution comprising: (1) about 0.4 to about 0.9 moles per liter iron (II) ion; (2) about 0.2 to about 0.8 moles per liter nickel (II) ion; and (3) about 0.002 to about 0.010 moles per liter tin (II) ions. Within the preferred embodiment of the present invention the foregoing metal ion concentrations are preferably provided by corresponding concentrations of: (1) iron (II) sulfate; (2) equal portions of nickel (II) sulfate and nickel (II) chloride; and (3) tin (II) acetate.

In addition to the metal ions, the aqueous plating solution also preferably comprises several additives and supporting electrolytes which provide for optimal plating characteristics of the aqueous plating solution. The additives and electrolytes preferably include, but are not limited to: (1) boric acid at about 0.3 to about 0.6 moles per liter; (2) sodium saccharin at about 0.005 to about 0.02 moles per liter; (3) sodium acetate at about 0.05 to about 0.09 moles per liter; and (4) sufficient acid or base to maintain a pH of from about 2.0 to about 3.0.

In addition to the metal ions, additives and supporting electrolytes comprising the aqueous plating solution, when forming the plated first magnetic inductor layer 24 through the electrochemical plating method employing the aqueous plating solution there are also employed several control parameters and limits within the electrochemical plating method, the parameters and limits including but not limited to: (1) a plating solution temperature of from about 20 to about 35 degrees centigrade; (2) a plating current density of from about 5 to about 20 milli-amps per square centimeter, (3) a plating voltage of from about 0.5 to about 5 volts; and (4) an agitation rate of from about 15 to about 200 reciprocations per minute.

In order to impart desirable magnetic properties to the plated first magnetic inductor layer 24 it is preferred within the preferred embodiment of the present invention to anisotropically magnetically align the magnetic domains within the plated first magnetic inductor layer 24. The magnetic domains within the plated first magnetic inductor layer 24 are preferably anisotropically magnetically aligned through exposure to a magnetic field H, as illustrated in FIG. 2, external to the plated first magnetic inductor layer 24 and within the plane of the air bearing surface (ABS) of the magnetoresistive (MR) read-write head whose schematic cross-sectional diagram is illustrated in FIG. 2. While the magnetic field H external to the plated first magnetic inductor layer 24 may be provided either during the process of electrochemically plating the plated first magnetic inductor layer 24 or after the plated first magnetic inductor layer 24 has been plated and formed upon the blanket first seed layer 20, within the preferred embodiment of the present invention the plated first magnetic inductor layer 24 is preferably anisotropically magnetically aligned while the plated first magnetic inductor layer 24 is being formed through the electrochemical plating method. Preferably, the plated first magnetic inductor layer 24 is anisotropically magnetically aligned in the external magnetic field H having a magnetic field strength of from about 100 to about 3000 gauss.

Upon forming and anisotropically magnetically aligning the plated magnetic inductor layer 24 as illustrated in FIG. 2, there is formed the plated magnetic inductor layer 24 typically possessing: (1) a saturation magnetization of from about 12 to about 16 kgauss; (2) a magnetic anisotropy of from about 8 to about 16 oersteds; (3) an easy axis coercivity of from about 0.3 to about 1.0 oersteds; (4) a hard axis magnetic permittivity of from about 1000 to about 4000; and (5) a resistivity of about 25 to about 70 micro-ohm.cm.

In order to assure optimal properties within the plated first magnetic inductor layer 24 it is also possible within the present invention to simultaneously thermally anneal and anisotropically magnetically align the plated first magnetic inductor layer 24. Under such circumstances, the plated first magnetic inductor layer 24 is simultaneously thermally annealed at a temperature of from about 120 to about 300 degrees centigrade and anisotropically magnetically aligned within the external magnetic field H of strength of from about 100 to about 3000 gauss. The simultaneous thermal annealing and anisotropic magnetic aligning of the plated first magnetic inductor layer 24 may be undertaken either in place of or in addition to the anisotropic magnetic aligning in absence of thermal annealing, as discussed above, but the simultaneous thermal annealing and anisotropic magnetic aligning may not practicably be undertaken while the plated first magnetic inductor layer 24 is being formed. When the plated first magnetic inductor layer 24 is simultaneously thermally annealed and anisotropically magnetically aligned, the plated first magnetic inductor layer 24 typically similarly possesses: (1) a saturation magnetization of from about 12 to about 16 kgauss; (2) a magnetic anisotropy of from about 8 to about 16 oersteds; (3) an easy axis coercivity of from about 0.3 to about 1.0 oersteds; (3) a hard axis magnetic permittivity of from about 1000 to about 4000; and (4) a resistivity of from about 25 to about 70 micro-ohm.cm.

Figure 3:
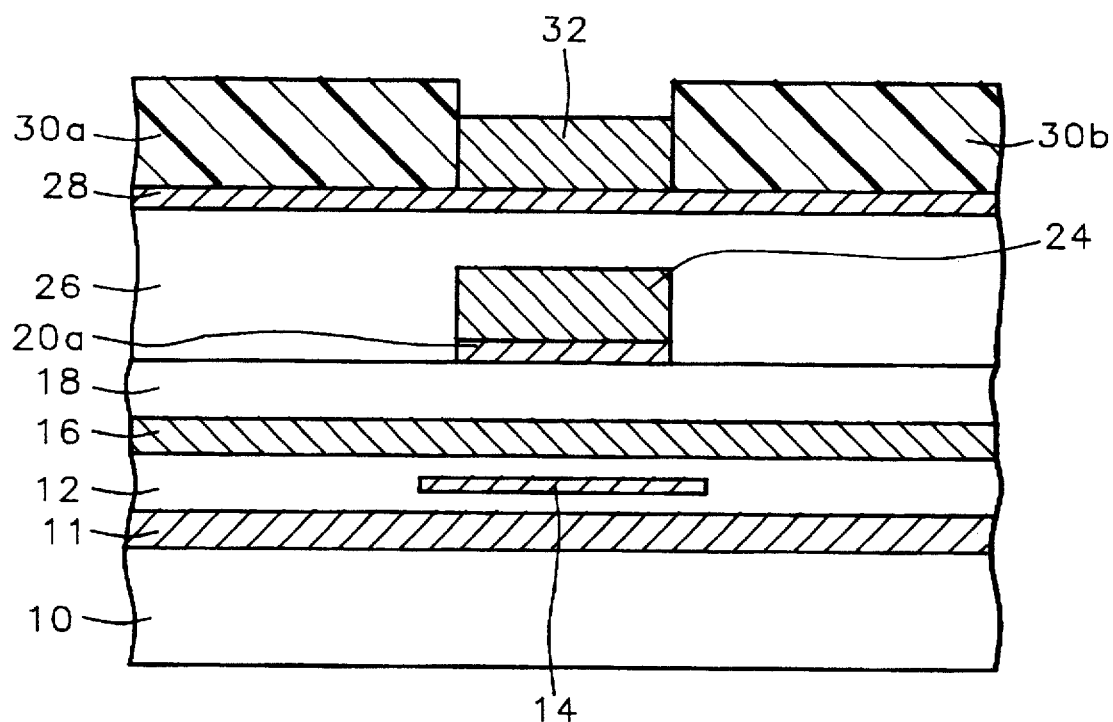

Referring now to FIG. 3, there is shown a schematic cross-sectional diagram illustrating the results of further processing of the magnetoresistive (MR) read-write head whose schematic cross-sectional diagram is illustrated in FIG. 2. Shown in FIG. 3 is a schematic cross-sectional diagram of the air bearing surface (ABS) of a magnetoresistive (MR) read-write head largely equivalent to the air bearing surface (ABS) of the magnetoresistive (MR) read-write head whose schematic cross-sectional diagram is illustrated in FIG. 2, but from whose surface there has first been removed the patterned first photoresist layers 22a and 22b. The patterned first photoresist layers 22a and 22b may be removed through methods as are conventional in the art, which will typically, although not exclusively, include wet chemical etch methods and reactive ion etch (RIE) dry plasma etch methods. Subsequent to removing the patterned first photoresist layers 22a and 22b, the blanket first seed layer 20 as illustrated in FIG. 2 is patterned, typically through an ion milling method employing the plated first magnetic inductor layer 24 as a mask, to form the patterned first seed layer 20a. Together, the plated first magnetic inductor layer 24 and the patterned first seed layer 20a, as illustrated in FIG. 3, form a first magnetic inductor pole tip within the air bearing surface (ABS) of the magnetoresistive (MR) read-write head whose schematic cross-sectional diagram is illustrated in FIG. 3.

As is illustrated in FIG. 3, there is then formed upon exposed portions of the second dielectric layer 18, the patterned first seed layer 20a and the plated first magnetic inductor layer 24 a third dielectric layer 26 having formed thereupon a blanket second seed layer 28. The blanket second seed layer 28 in turn has formed thereupon a pair of patterned second photoresist layers 30a and 30b, and the portion of the blanket second seed layer 28 exposed through the patterned second photoresist layers 30a and 30b has formed thereupon a plated second magnetic inductor layer 32.

Within the preferred embodiment of the present invention, the third dielectric layer 26 is preferably formed through methods, materials and dimensions analogous or equivalent to the methods, materials and dimensions employed in forming the second dielectric layer 18 or the first dielectric layer 12. Similarly, within the preferred embodiment of the present invention the blanket second seed layer 28 is preferably formed through methods, materials and dimensions analogous or equivalent to the methods, materials and dimensions employed in forming the blanket first seed layer 20. In addition, within the preferred embodiment of the present invention the patterned second photoresist layers 30a and 30b are preferably formed through methods, materials and dimensions analogous or equivalent to the methods, materials and dimensions employed in forming the patterned first photoresist layers 22a and 22b. Finally, within the preferred embodiment of the present invention the plated second magnetic inductor layer 32 is preferably formed through methods, materials and dimensions analogous or equivalent to the methods, materials and dimensions employed in forming the plated first magnetic inductor layer 24. Within the preferred embodiment of the present invention the plated second magnetic inductor layer 32 is also anisotropically magnetically aligned or optionally thermally annealed and anisotropically magnetically aligned in a manner analogous or equivalent to manner through which the plated first magnetic inductor layer 24 is either anisotropically magnetically aligned or thermally annealed and anisotropically magnetically aligned, as disclosed above.

Figure 4:
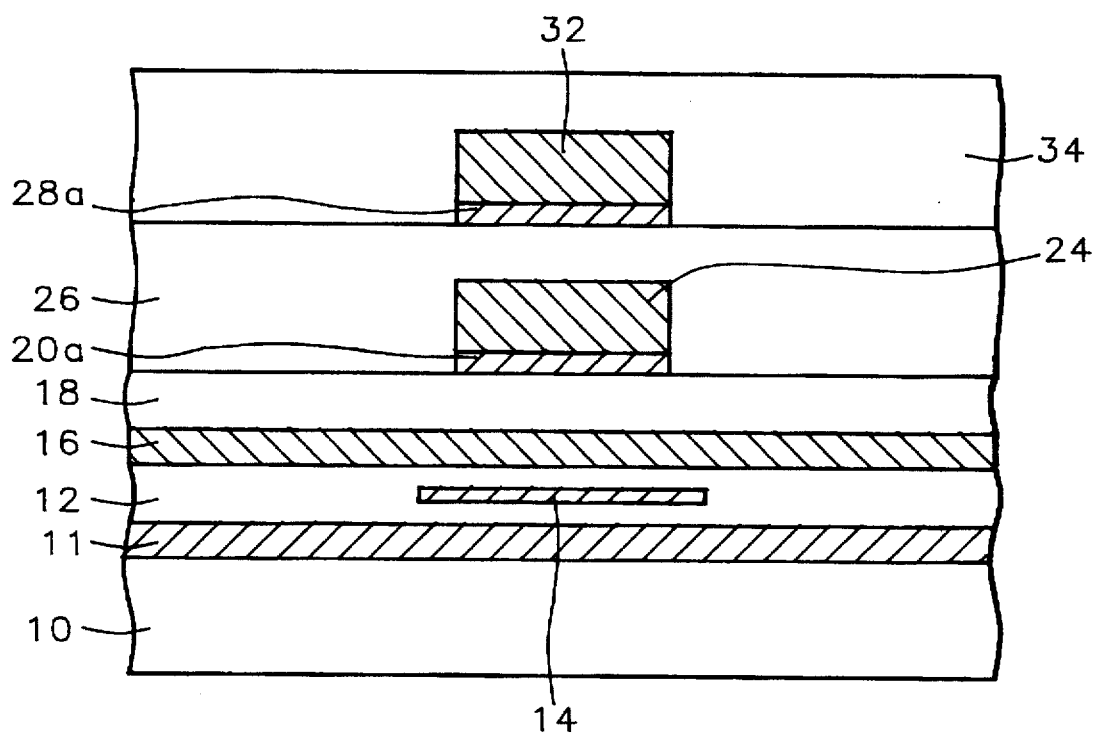

Referring now to FIG. 4, there is shown a schematic cross-sectional diagram illustrating the results of further processing of the magnetoresistive (MR) read-write head whose schematic cross-sectional diagram is illustrated in FIG. 3. Shown in FIG. 4 is a schematic cross-sectional diagram of the air bearing surface (ABS) of a magnetoresistive (MR) read-write head otherwise equivalent to the magnetoresistive (MR) read-write head whose schematic cross-sectional diagram is illustrated in FIG. 3, but: (1) from whose surface has been removed the patterned second photoresist layers 30a and 30b; (2) from whose blanket second seed layer 28 has been formed a patterned second seed layer 28a; and (3) upon whose surface is then formed a planarized fourth dielectric layer 34. Within the preferred embodiment of the present invention, the patterned second photoresist layers 30a and 30b are preferably removed through methods and materials analogous or equivalent to the methods and materials employed in removing from the magnetoresistive (MR) read-write head whose schematic cross-sectional diagram is illustrated in FIG. 2 the patterned first photoresist layers 22a and 22b. Similarly, within the preferred embodiment of the present invention the patterned second seed layer 28a is formed from the blanket second seed layer 28 through methods and materials analogous or equivalent to the methods and materials through which the patterned first seed layer 20a as illustrated in FIG. 3 is formed from the blanket first seed layer 20 as illustrated in FIG. 2. Finally, within the preferred embodiment of the present invention, the fourth dielectric layer 34 is preferably formed upon the exposed portions of the third dielectric layer 26, the patterned second seed layer 28a and the plated second magnetic inductor layer 32 through methods and materials analogous or equivalent to the methods and materials employed in forming the planarized third insulator layer 26 upon the exposed portions of the planarized second dielectric layer 18, the patterned first seed layer 20a and the plated first magnetic inductor layer 24. As is understood by a person skilled in the art, the plated second magnetic inductor layer 32 and the patterned second seed layer 28a form a second magnetic inductor pole tip within the air bearing surface (ABS) of the magnetoresistive (MR) read-write head whose schematic cross-sectional diagram is illustrated in FIG. 4.

As is understood by a person skilled in the art, there may, in addition to the various layers illustrated in FIG. 4, also be formed within the magnetoresistive (MR) read-write head whose schematic cross-sectional diagram is illustrated in FIG. 4 additional layers as are conventional in the art of magnetoresistive (MR) read-write head fabrication. The additional layers may include, but are not limited to, additional shield layers, conductor layers, dielectric layers, interconnection layers and passivation layers.

Similarly, as is also understood by a person skilled in the art and discussed briefly above, there may also be formed in accord with the methods and materials outlined for the preferred embodiment of the present invention a merged magnetoresistive (MR) read-write head or an inductive read-write magnetic head. In comparison with the magnetoresistive (MR) read-write head whose schematic cross-sectional diagram is illustrated in FIG. 4, a merged magnetoresistive (MR) read-write head typically excludes: (1) the second magnetic inductor pole tip comprised of the patterned second seed layer 28a and the plated second magnetic inductor layer 32; and (2) the fourth dielectric layer, while employing the second shield layer 16 simultaneously as a shield layer and as a magnetic inductor pole layer. Similarly, in comparison with the magnetoresistive (MR) read-write head whose schematic cross-sectional diagram is illustrated in FIG. 4, an inductive magnetic read-write head typical excludes the first shield layer 11, the second shield layer 16, the magnetoresistive sensor element layer 14, the first dielectric layer 12 and the second dielectric layer 18.

EXAMPLE

A three inch diameter silicon wafer was obtained and there was formed thereupon a blanket seed layer of a permalloy conductive seed material to a thickness of about 1000 angstroms. The blanket seed layer was formed through a physical vapor deposition (PVD) sputtering method. Upon the blanket seed layer there was then formed through an electrochemical plating method in accord with the preferred embodiment of the present invention a plated magnetic layer of an elemental composition comprising iron, nickel and tin.

The magnetic layer was plated from an aqueous plating solution comprising: (1) about 0.75 moles per liter iron (II) sulfate; (2) about 0.25 moles per liter nickel (II) chloride; (3) about 0.30 moles per liter nickel (II) sulfate; (4) about 0.0045 moles per liter tin (II) acetate; (5) about 0.45 moles per liter boric acid; (6) about 0.01 moles per liter sodium saccharin; (7) about 0.07 moles per liter sodium acetate; (8) sufficient acid or base to maintain a pH of about 2.7; and (9) about 0.1 gram per liter FC-95 surfactant available from 3M Company, St. Paul, Minn.

The electrochemical plating method employing the aqueous plating solution was undertaken at: (1) a plating temperature of about 25 degrees centigrade; (2) a plating current density of about 10 milli-amps per square centimeter; (3) a plating voltage of about 2.5 volts; (4) an agitation rate of about 60 reciprocations per minute; and (5) an applied external magnetic field of about 1000 gauss, thus forming an anisotropically magnetically aligned plated magnetic layer. The anisotropically magnetically aligned plated magnetic layer was formed to a thickness of about 4 microns. The elemental composition of the anisotropically magnetically aligned plated magnetic layer was determined by energy dispersive x-ray analysis to be about 55 weight percent iron, about 45 weight percent nickel and about 0.2 weight percent tin. The magnetic properties of the anisotropically magnetically aligned plated magnetic layer were then determined through methods as are conventional in the art. The anisotropically magnetically aligned plated magnetic layer was then thermally annealed at a temperature of about 210 degrees centigrade for a time period of about 180 minutes, within an external magnetic field of about 1500 gauss, to form from the anisotropically magnetically aligned plated magnetic layer a thermally annealed and anisotropically magnetically aligned plated magnetic layer. The magnetic properties of the thermally annealed and anisotropically magnetically aligned plated magnetic layer were also determined through methods as are conventional in the art. The magnetic properties of the anisotropically magnetically aligned plated magnetic layer and the thermally annealed and anisotropically magnetically aligned plated magnetic layer are reported in Table I, along with corresponding representative values for equivalent magnetic properties determined for a permalloy magnetic layer of otherwise equivalent dimensions.

TABLE I

| Magnetic Layer | Saturation Magnet. (kgauss) | Magnetic Anistrop. (oersteds) | Easy Axis Coercivity (oersteds) | Hard Axis Permittivity | Resistivity (micro-ohm. cm) |
| --- | --- | --- | --- | --- | --- |
| Anisotrop. Align. Fe/Ni/Sn | 15.5 | 9 | 0.4 | 1700 | 55 |
| Anneal/Align. Fe/Ni/Sn | 15.5 | 10.5 | 0.3 | 1500 | 55 |
| Permalloy | 9 | 4 | 0.4 | 2200 | 20 |

As is seen from review of the data in Table I, there is formed through the method of the present invention an anisotropically magnetically aligned magnetic layer with generally superior magnetic properties in comparison with a permalloy magnetic material layer of otherwise equivalent dimensions. In addition, as is also seen from review of the data in Table I, there is formed through the method of the present invention a thermally annealed and anisotropically magnetically aligned magnetic layer with comparable properties in comparison with the anisotropically magnetically aligned magnetic layer.

Although not specifically directed towards the magnetic properties of the anisotropically magnetically aligned magnetic layer or the thermally annealed and anisotropically magnetically aligned magnetic layer formed in accord with the examples, the film stress of the anisotropically magnetically aligned layer was also measured and determined to be about 5E8 dynes per square centimeter. A film stress in this range is comparable with film stresses typically observed for permalloy layers employed within various locations within magnetic heads, including but not limited to magnetoresistive (MR) read-write heads.

As is understood by a person skilled in the art, the preferred embodiment and examples of the present invention are illustrative of the present invention rather than limiting of the present invention. Revisions and modifications may be made to methods, structures and dimensions through which is formed the preferred embodiment and examples of the present invention while still providing embodiments and examples which are within the spirit and scope of the present invention, as defined by the accompanying claims.

What is claimed is:

1. A magnetic material having an elemental composition comprising:

about 40 to about 60 weight percent iron;

about 40 to about 60 weight percent nickel; and about 0.002 to about 1 weight percent tin.

2. A magnetic thin film having an elemental composition comprising:

about 40 to about 60 weight percent iron;

about 40 to about 60 weight percent nickel; and about 0.002 to about 1 weight percent tin.

3. The magnetic thin film of claim 2 wherein:

the magnetic thin film has a thickness of from about 1 to about 4 microns;

the magnetic thin film is anisotropically magnetically aligned to form an anisotropically magnetically aligned magnetic thin film having:

a saturation magnetization of from about 12 to about 16 kgauss;

a magnetic anisotropy of from about 8 to about 16 oersteds;

an easy axis coercivity of from about 0.3 to about 1.0 oersteds;

a hard axis permittivity of from about 1000 to about 4000 gauss; and a resistivity of from about 25 to about 70 micro-ohm.cm.

4. The magnetic thin film of claim 2 wherein the magnetic thin film is formed through a deposition method selected from the group of deposition methods consisting of plating deposition methods, evaporation deposition methods and sputtering deposition methods.

5. A magnetic head having formed therein the anisotropically magnetically aligned magnetic thin film of claim 3, wherein:

the magnetic head is chosen from the group of magnetic heads consisting of inductive read magnetic heads, inductive write magnetic heads, inductive read-write magnetic heads and magnetoresistive (MR) read-write magnetic heads; and the anisotropically magnetically aligned magnetic thin film is employed within the magnetic head as a layer selected from the group of layers consisting of magnetic read inductor layers, magnetic write inductor layers, magnetic read-write inductor layers and magnetic shield layers.

6. A magnetic sensor having fabricated therein the anisotropically magnetically aligned magnetic thin film of claim 3, wherein the anisotropically magnetically aligned magnetic thin film is employed as a magnetic magnetic flux guide within the magnetic sensor.

7. A method for forming a magnetic thin film comprising:

providing a substrate; and forming through an electroplating method over the substrate a magnetic thin film, the magnetic thin film having an elemental composition comprising:

about 40 to about 60 weight percent iron;

about 40 to about 60 weight percent nickel; and about 0.02 to about 1 weight percent tin.

8. The method of claim 7 wherein the electroplating method employs an aqueous electroplating solution comprising:

about 0.4 to about 0.9 moles per liter iron (II) ions;

about 0.2 to about 0.8 moles per liter nickel (II) ions; and about 0.002 to about 0.010 moles per liter tin (II) ion.

9. The method of claim 8 wherein the electroplating method also employs:

a pH of from about 2.0 to about 3.5;

a temperature of from about 20 to about 35 degrees centigrade;

a current density of from about 5 to about 20 milli-amps per square centimeter; and a plating voltage of from about 0.5 to about 5 volts.

10. The method of claim 7 wherein the magnetic thin film is formed to a thickness of from about 1 to about 4 microns.

11. The method of claim 7 further comprising anisotropically magnetically aligning the magnetic thin film in a magnetic field of from about 100 to about 3000 gauss to form over the substrate an anisotropically magnetically aligned magnetic thin film having:

a saturation magnetization of from about 12 to about 16 kgauss;

an anisotropy of from about 8 to about 16 oersteds;

an easy axis coercivity of from about 0.3 to about 1.0 oersteds;

a hard axis permittivity of from about 1000 to about 4000; and a resistivity of from about 25 to about 70 micro-ohm.cm.

12. The method of claim 11 wherein the magnetic thin film is anisotropically magnetically aligned while the magnetic thin film is formed over the substrate through the electrochemical plating method.

13. The method of claim 11 wherein the magnetic thin film is anisotropically magnetically aligned after the magnetic thin film is formed over the substrate through the electrochemical plating method.

14. The method of claim 7 further comprising annealing the magnetic thin film at a temperature of from about 120 to about 300 degrees centigrade while simultaneously anisotropically magnetically aligning the magnetic thin film within a magnetic field of from about 100 to about 3000 gauss to form from the magnetic thin film a thermally annealed and anisotropically magnetically aligned magnetic thin film having:

a saturation magnetization of from about 12 to about 16 kgauss;

an anisotropy of from about 8 to about 16 oersteds;

an easy axis coercivity of from about 0.3 to about 1.0 oersteds;

a hard axis permittivity of from about 1000 to about 4000; and a resistivity of from about 25 to about 70 micro-ohm.cm.

15. A magnetic head having formed therein the anisotropically magnetically aligned magnetic thin film of claim 11, wherein:

the magnetic head is chosen from the group of magnetic heads consisting of inductive read magnetic heads, inductive write magnetic heads, inductive read-write magnetic heads and magnetoresistive (MR) read-write magnetic heads; and the anisotropically magnetically aligned magnetic thin film is employed within the magnetic head as a layer selected from the group of layers consisting of magnetic read inductor layers, magnetic write inductor layers, magnetic read-write inductor layers and magnetic shield layers.

16. A magnetic sensor having fabricated therein the anisotropically magnetically aligned magnetic thin film of claim 11, wherein the anisotropically magnetically aligned magnetic thin film is employed as a magnetic flux guide within the magnetic sensor.

17. A magnetic head having formed therein the thermally annealed and anisotropically magnetically aligned magnetic thin film of claim 14, wherein:

the magnetic head is chosen from the group of magnetic heads consisting of inductive read magnetic heads, inductive write magnetic heads, inductive read-write magnetic heads and magnetoresistive (MR) read-write magnetic heads; and the thermally annealed and anisotropically magnetically aligned magnetic thin film is employed within the magnetic head as a layer selected from the group of layers consisting of magnetic read inductor layers, magnetic write inductor layers, magnetic read-write inductor layers and magnetic shield layers.

18. A magnetic sensor having fabricated therein the thermally annealed and anisotropically magnetically aligned magnetic thin film of claim 14, wherein the thermally annealed and anisotropically magnetically aligned magnetic thin film is employed as a magnetic flux guide within the magnetic sensor.

* * * * *